United States Patent
Doh et al.

(10) Patent No.: US 7,272,311 B2
(45) Date of Patent: *Sep. 18, 2007

(54) OPTICAL RING NETWORK FOR BURST DATA COMMUNICATION

(75) Inventors: Sang-Hyun Doh, Hwasong-shi (KR); Ki-Cheol Lee, Suwon-shi (KR); Se-Kang Park, Songnam-shi (KR); Yun-Je Oh, Yongin-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 761 days.

This patent is subject to a terminal disclaimer.

(21) Appl. No.: 10/456,166

(22) Filed: Jun. 6, 2003

(65) Prior Publication Data

US 2004/0213572 A1   Oct. 28, 2004

(30) Foreign Application Priority Data

Oct. 12, 2002  (KR) .................. 10-2002-0062248

(51) Int. Cl.
*H04J 14/02* (2006.01)
(52) U.S. Cl. .................. 398/48; 398/59; 398/83
(58) Field of Classification Search ............ 398/48–51, 398/59, 83
See application file for complete search history.

(56) References Cited

U.S. PATENT DOCUMENTS

| 6,850,515 B2* | 2/2005 | Chang et al. ............ 370/352 |
| 2003/0063348 A1* | 4/2003 | Posey, Jr. .................. 359/139 |
| 2004/0151171 A1* | 8/2004 | Lee et al. .................. 370/380 |

FOREIGN PATENT DOCUMENTS

| JP | 2000-349828 | 12/2000 |
| JP | 2001-244954 | 9/2001 |
| JP | 2002-026982 | 1/2002 |

\* cited by examiner

*Primary Examiner*—Leslie Pascal
(74) *Attorney, Agent, or Firm*—Cha & Reiter, LLC

(57) ABSTRACT

Disclosed is an optical ring network for burst data communication having a plurality of core nodes connected with each other through fiber links. Each core node comprises a demultiplexer for demultiplexing a received optical signal into a plurality of channels by wavelength, an add/drop section for dropping channels selected from the plurality of channels based on a control signal, a multiplexer for multiplexing and outputting the plurality of channels inputted through the add/drop section, a branching section arranged between the demultiplexer and the add/drop section for branching off channel portions from each channel, and a controller for recognizing destinations for frames with each channel modulated and outputting the control signal for dropping the selected channels to the add/drop section.

7 Claims, 6 Drawing Sheets

OPTICAL RING NETWORK FOR BURST DATA COMMUNICATION

CLAIM OF PRIORITY

This application claims priority to an application entitled "Optical Ring Network For Burst Data Communication," filed in the Korean Intellectual Property Office on Oct. 12, 2002 and assigned Serial No. 2002-62248, the contents of which are hereby incorporated by reference.

BACKGROUND OF THE INVENTION

1. Field of the Invention

The present invention relates to an optical ring network, and in particular to an optical ring network employing wavelength division multiplexing.

2. Description of the Related Art

Recently, it has been recognized that it is essential for all optical networks to be configured to deal with tremendous growth in data traffic. To this end, various solutions have been proposed for configuring optical networks. In addition, due to considerable efforts in developing various optical transmission systems and optical routing devices various products are available on the market. An optical ring network, which is based on Wavelength Division Multiplexing (WDM), is a network topology that is attracting considerable attention. This is due to its easy configuration, switching restoration, reduction of initial costs and so forth. Such optical ring networks have already been adopted by many countries in the world.

Such an optical ring network is configured to perform communication between nodes using a plurality of channels. Specifically, one or more channels that are needed for the communication connection between the nodes are allocated to a pair of nodes and bi-directional communication is carried out through the channels. However, such networks have serious drawbacks in its flexibility, in particular, in coping with data traffic bursts. In addition, they have a significant decrease in the total bandwidth performance in the network. These drawbacks are due to the optical ring network being configured to route communication through channels and because these channels are set in advance.

To overcome these disadvantages, engineers have made significant progress in researching and developing an optical router which is based on optical packet switching (OPS) and optical burst switching (OBS). Nevertheless, many problems remain in realizing the OPS and OBS techniques. Since the OPS or OBS performs switching of packets or bursts, the packets or bursts should not only be free from collision with each other at each node in the network, but also should enable switching at a very fast speed. To solve the latter problems, (the problems caused by optical components such as optical buffers), high speed optical switches and so forth should be resolved first. For this reason, alternative solutions are being sought, which make use of a burst delay line, a wavelength converter, etc., all of which are based on optical fibers. However, such solutions have not yielded satisfactory results. Moreover, these solutions do not yet satisfy economic considerations, which generally take considerable time.

In short, conventional optical ring networks, which employ WDM and wherein optical paths are set by the channels, is suitable for transmission of high capacity static data, but not for transmission of burst data. Moreover, conventional networks make it impossible to effectively make use of a high capacity bandwidth without waste.

Further, in the proposed optical router networks based on OPS and OBS, to compensate for the aforementioned drawbacks, components such as an optical buffer, a wavelength converter, etc. are absolutely needed to reduce collision between data. However, the conventional techniques still encounter many problems and difficulties in implementing these components, especially from an economical point of view.

SUMMARY OF THE INVENTION

The present invention reduces or overcomes many of the above limitations by providing an optical ring network suitable for transmission of a high volume of burst data and which has an excellent implementation capability from a technical and economical point of view.

The present invention also provides an optical ring network capable of improving a bandwidth performance in the network.

In accordance with on illustrative embodiment of the principles of the present invention, an optical ring network is provided for burst data communication having a plurality of core nodes connected with each other by means of fiber links, each core node comprising a demultiplexer for demultiplexing a received optical signal into a plurality of channels by wavelength, an add/drop section for dropping channels selected from the plurality of channels, based on a control signal, a multiplexer for multiplexing and outputting the plurality of channels inputted through the add/drop section, a branching section, arranged between the demultiplexer and the add/drop section, for branching off channel portions from each channel, and a controller for recognizing destinations of frames modulated on each channel by means of the branched channel portions, and outputting the control signal for dropping the selected channels to the add/drop section.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENT

Figure 1:
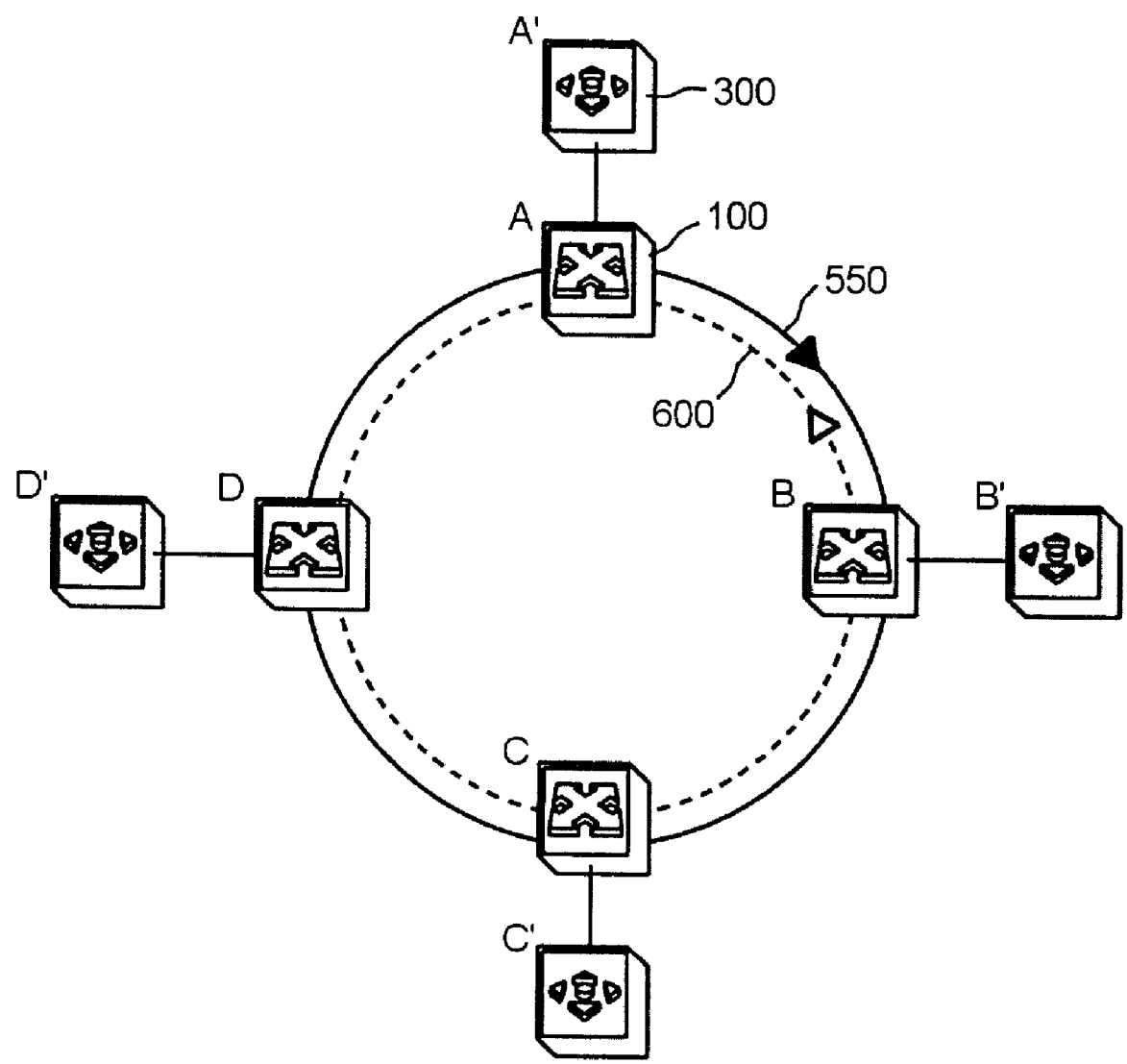
FIG. 1 shows a schematic configuration of an optical ring network for burst data communication according to a preferred embodiment of the present invention.

In the following description of the present invention, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. Moreover, it will be recognized that certain aspects of the figures are simplified for explanation purposes and that the full system environment for the invention will comprise many known functions and configurations all of which need not be shown here. In the drawings, the same or similar elements are denoted by the same reference numerals even though they are depicted in different drawings.

FIG. 1 shows a schematic configuration of an optical ring network for burst data communication according to a preferred embodiment of the present invention. In FIG. 1, the ring network includes a plurality of core nodes 100 connected with forward and backward fiber links 500 and 600, or working and protection fiber links. Core nodes 100 are also connected to a plurality of edge nodes 300, which are connected in a one-to-one correspondence. At least one optical signal, which consists of a plurality of channels, is transmitted between the core nodes 100 and is subjected to wavelength division multiplexing (WDM). Concurrently, at least one independent channel is transmitted between any one of the core nodes and the corresponding one of the edge nodes. The ring network performs communication using a burst datum unit, in which packet data collected from a plurality of service devices are sorted based on a destination. The sorted data is bound at a predetermined data length, and the bound data is transmitted. That is to say, a frame, which is transmitted on each channel, includes a burst datum consisting of packet data having an identical destination and a quality of service (QOS), and a header datum indicating a destination of the frame. In each core node 100, a header datum is recognized from the frame modulated on each channel received, and on this basis, switching is carried out. Specifically, when each core node 100 is matched with the destination, which the recognized header datum indicates, it causes the modulated frame to be dropped. However, when it is not matched, it causes the modulated frame to be passed through to the next core node 100.

Figure 2:
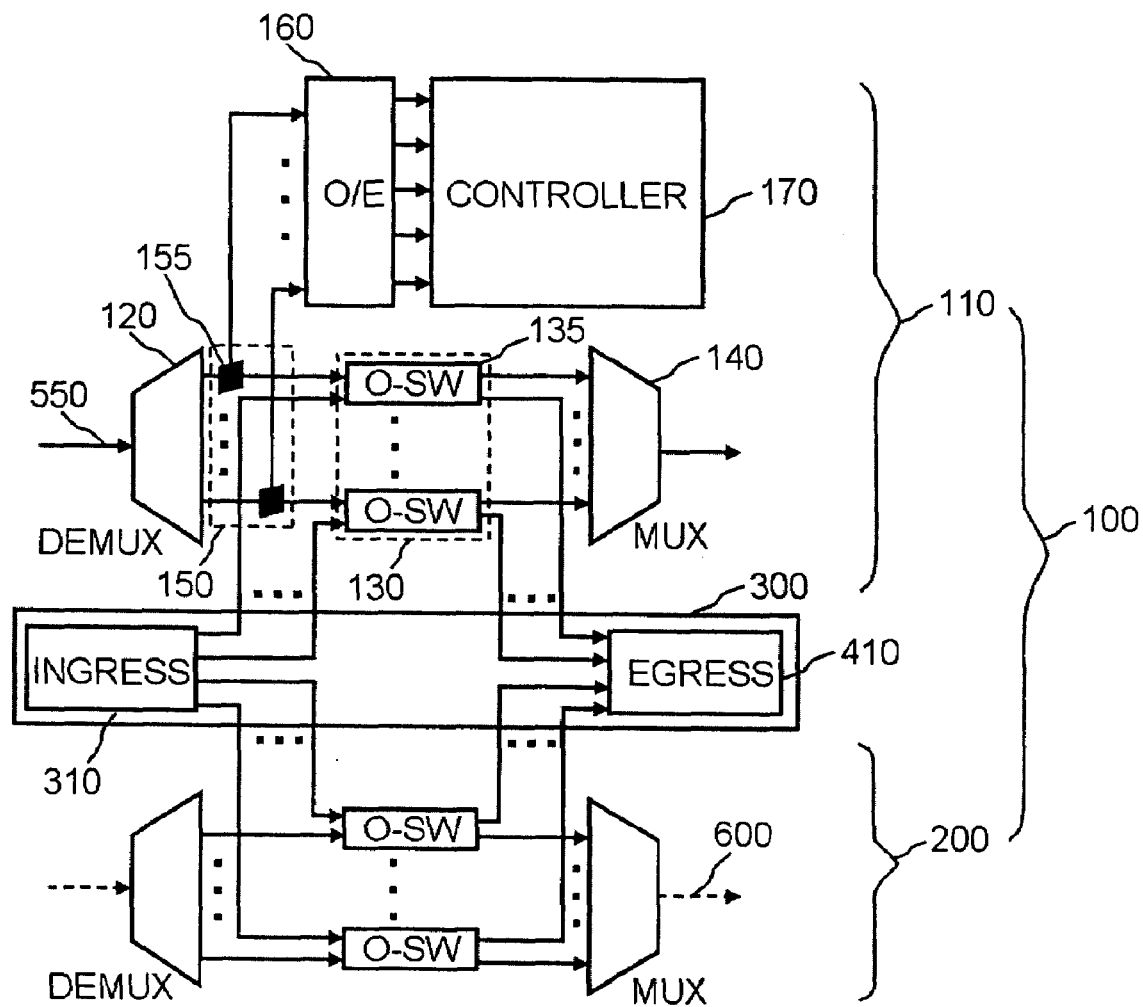
FIG. 2 shows a schematic configuration of any one of the core nodes shown in FIG. 1.

FIG. 2 shows a schematic configuration of any one of the core nodes shown in FIG. 1. In FIG. 2, the core node 100 includes various components, which are sorted into ones 110 for forward fiber link 550 and ones 200 for backward fiber link 600. In a normal state, the forward and backward fiber links 550 and 600 are all utilized. However, in an abnormal or link failure state, the backward fiber link 600 is utilized more than the forward fiber link 550. For the sake of convenience and not by limitation, the following description will be made on components 200 for the backward fiber link 600.

Core node 100 includes a demultiplexer 120, an add/drop section 130, a multiplexer 140, a branching section 150, an optical receiver 160 and a controller 170.

The demultiplexer 120 carries out demultiplexing and the outputting an optical signal inputted from another adjacent core node by channel (or by wavelength). Demultiplexer 120 may make use of, for example, an 1×N arrayed waveguide grating, which has one input terminal and N number of output terminals.

Add/drop section 130 includes a number (N) of 2×2 optical switches 135, which are connected to the output terminals of demultiplexer 120 in a one-to-one correspondence. Optical switches 135 perform switching operation according to a control signal of controller 170. Also, optical switches 135 function either to drop channels received from demultiplexer 120 toward an egress node 410, which is configured for the corresponding edge node 300, or to pass them through to multiplexer 140. Further, optical switches 135 function to add channels inputted from an ingress node 310, which is configured for the corresponding edge node 300, and to output the added channels to multiplexer 140.

Multiplexer 140 allows a plurality of channels inputted from the add/drop section to be multiplexed and outputted.

Multiplexer 140 may utilize, for example, an N×1 arrayed waveguide grating, which has N input terminals and one output terminal. Like a general optical device, the arrayed waveguide grating has a reversible capability so that it can be used as a multiplexer or demultiplexer.

Branching section 150 includes N number of 1×2 tap couplers 155 which are connected to the output terminals of demultiplexer 120 in a one-to-one correspondence. Branching section 150 is positioned between demultiplexer 120 and add/drop section 130, and branches off channel portions from each channel. For instance, for each channel inputted into tap coupler 155, branching section 150 supplies a branched channel portion with 10% of the entire power of each channel to optical receiver 160 and the other branched channel portion with 90% of the entire power of each channel to optical switches 135.

Optical receiver 160 includes a number (N) of photodiodes, which are connected to the N number of optical couplers in a one-to-one correspondence. Optical receiver 160 performs photoelectric conversion of the split channel and outputs the results.

Controller 170 demodulates a frame on the channel, which is subjected to photoelectric conversion, extracts a header datum of each frame and recognizes a destination corresponding to the header datum. Further, the controller detects frames whose destinations are matched with add/drop section 130 and outputs a control signal for alternatively dropping the detected frames toward add/drop section 130. Thus, the controller outputs a control signal to optical switches 135 into which channels with the modulated frames among the detected frames are inputted. Optical switches 135 perform a switching process, so that the concerned channels are dropped relative to egress node 410. Further, controller 170 determines channels for transmitting the modulated frames as well as time points for transmitting the channels by recognizing destinations, QOS and so forth of frames created from ingress node 310.

Each edge node 300 includes ingress node 310 and egress node 410.

Figure 3:
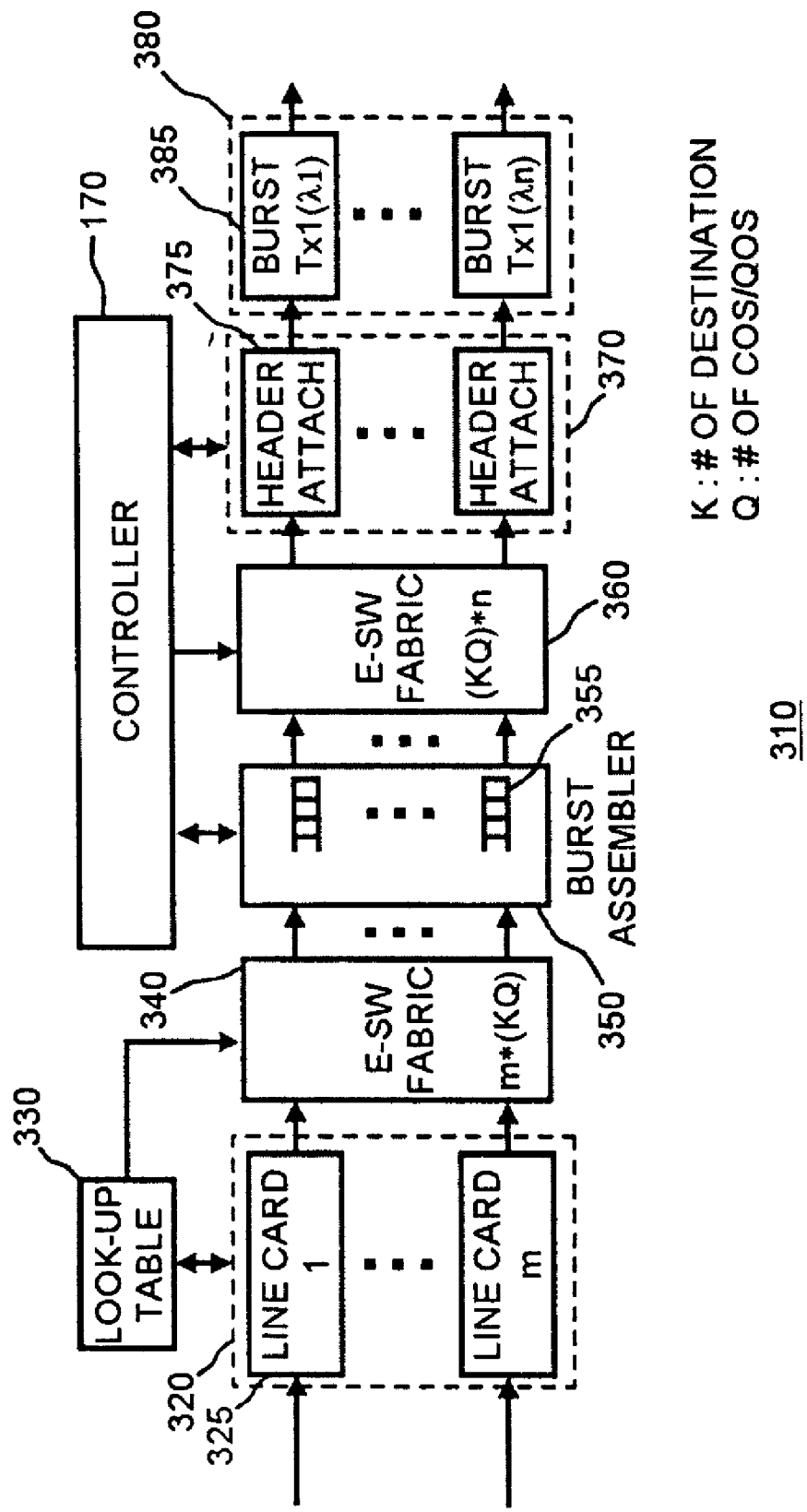
FIG. 3 shows a schematic configuration of an ingress node shown in FIG. 2.

FIG. 3 shows a schematic configuration of an ingress node shown in FIG. 2. In FIG. 3, ingress node 310 includes an interface section 320, a look-up table 330, a first electric switch 340, a burst assembler 350, a second electric switch 360, a header attaching section 370, and an optical transmitting section 380.

Interface section 320 includes a number (M) of interface cards 325, each of which is physically connected with each service device. This service device may become an IP router, an Ethernet switch, a SONET equipment and so forth. Interface section 320 provides interfaces to various service formats. It also recognizes a destination, a QOS and so forth, in such a way that control signals of packet data received from several places at a time, for example header packets of IP data, are extracted.

Look-up table 330 has a buffer number of burst assembler 350 stored according to a destination and a QOS.

First electric switch 340 outputs data inputted from each of the interface cards 325 to the pertinent buffers 355 with reference not only to the destination and QOS recognized at interface section 320 but also look-up table 330.

Burst assembler 350 includes a number (N) of buffers 355, which are subdivided according to a destination and a QOS. Burst assembler 350 causes packet data stored at respective buffers 355 to be bound at a predetermined length, thus creating burst data.

Header attaching section 370 includes a number (N) of header attachments 375, which are connected to the buffers in a one-to-one correspondence. When a header datum representing the desired destination is attached to leading end of the burst datum inputted through second electric switch 360, a finished frame is obtained.

Second electric switch 360 enables each burst datum distributed to buffers 355 of burst assembler 350 based on a control signal of controller 170 to be outputted to the pertinent header attachments 375. That is to say, the second electric switch functions to output each burst datum the pertinent header attachments 375 based on a selected channel, so as to transmit the burst data distributed to buffers 355 into core node 100.

Optical transmitting section 380 includes a number (N) of optical transmitters 385, which output channels whose wavelengths are different from each other. Optical transmitters 385 are connected to header attachments 375 in a one-to-one correspondence, and output channels with the modulated frames, which are inputted from the pertinent header attachments 375. For example, optical transmitters 385 may make use of a laser diode, a light emitting diode and so forth.

Figure 4:
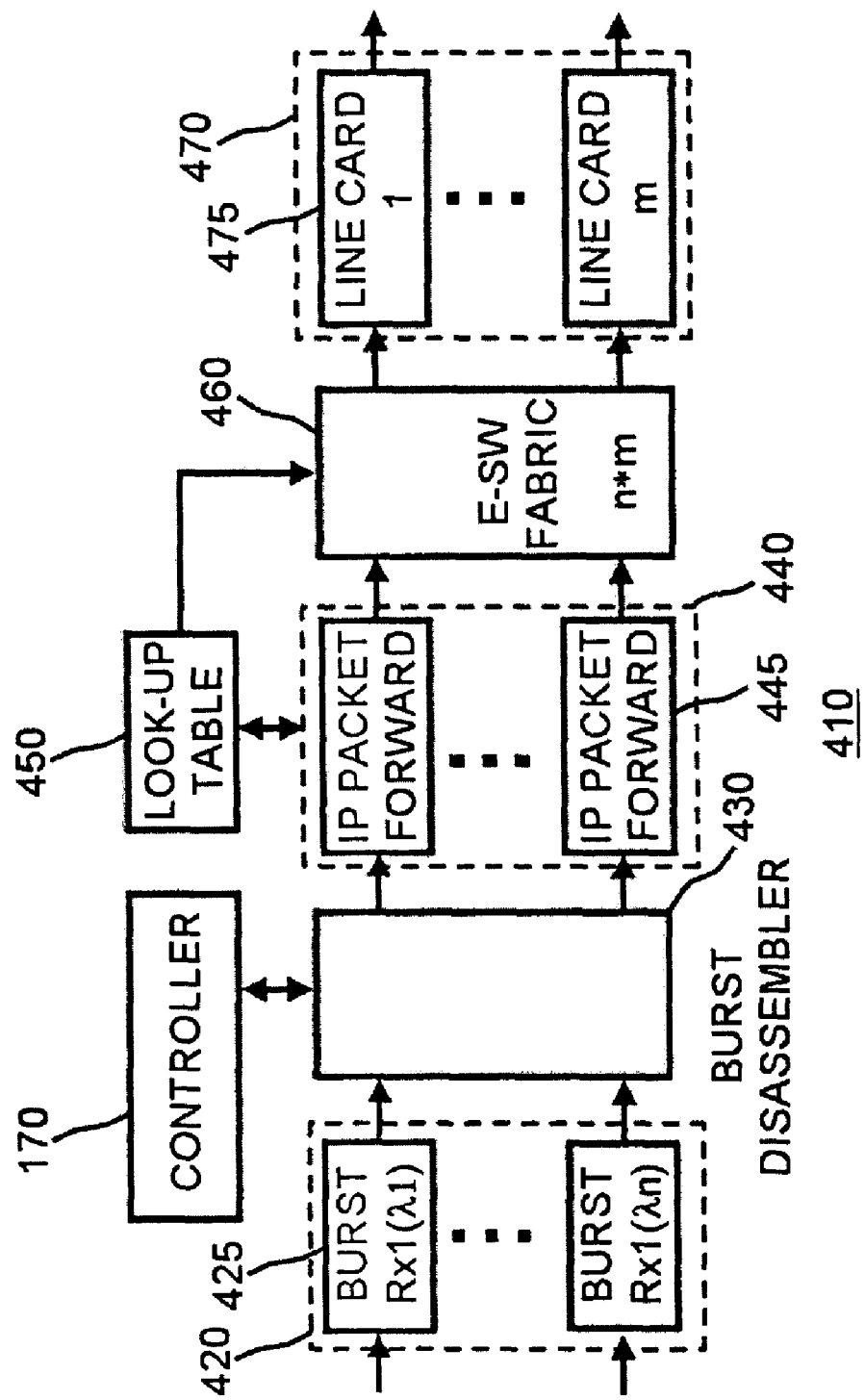
FIG. 4 shows a schematic configuration of an egress node shown in FIG. 2.

FIG. 4 shows a schematic configuration of an egress node shown in FIG. 2. In FIG. 4, each egress node 410 includes an optical receiving section 420, a burst disassembler 430, a look-up table 450, an IP packet forwarding section 440, an electric switch 460 and an interface section 470.

Optical receiving section 420 includes a number (N) of optical receivers 425, which receive channels whose wavelengths are different from each other and which are connected to optical switches 135 of core node 100 in a one-to-one correspondence. Optical receivers 425 carry out photoelectric conversion of the inputted channels and output the results. For example, optical receivers 425 may utilize photodiodes.

Burst disassembler 430 removes a header datum from each frame inputted from each optical receiver 425, and disassembles a burst datum into packet data.

IP packet forwarding section 440 includes a number (M) of IP packet forwarders 445 and recognizes a final destination, i.e., an IP address of packet data inputted from burst disassembler 430.

Look-up table 450 has numbers of the pertinent interface cards 475 stored according to each IP address.

Electric switch 460 outputs packet data inputted from each IP packet forwarder 445 to the pertinent interface cards 475 of interface section 470 with reference to both IP addresses recognized at IP packet forwarding section 440 and look-up table 450.

Interface section 470 includes a number (M) of interface cards 475, each of which is physically connected with each service device. For example, the service device may become an IP router, an Ethernet switch, a SONET equipment and so forth. Interface section 470 provides interfaces to various service formats.

Figure 5:
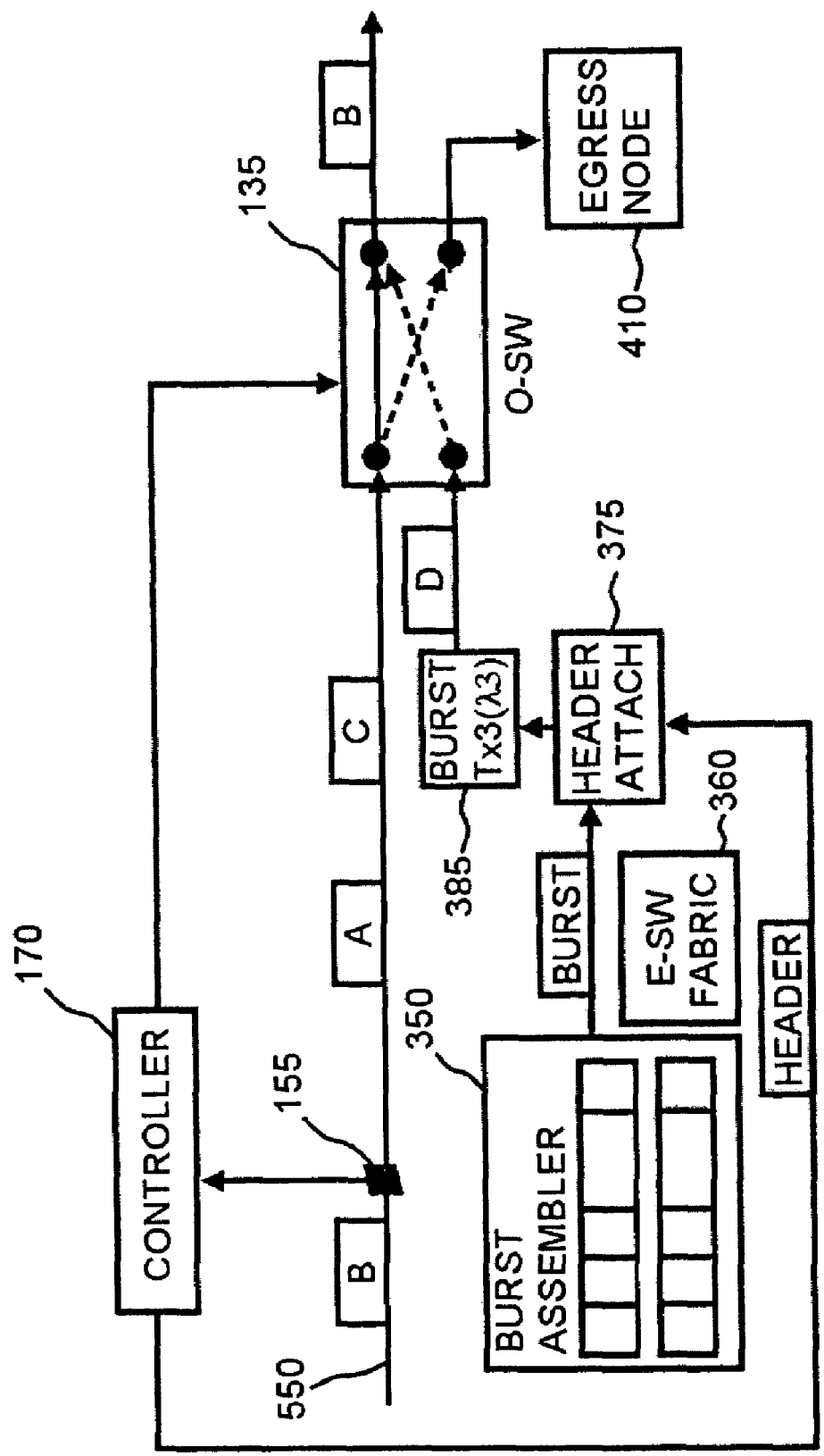
FIG. 5 is a schematic illustrating an add or drop process of a channel of one core node A shown in FIG. 1.

FIG. 5 is a schematic illustrating an add/drop process of a channel of the core node A shown in FIG. 1. For the purpose of clarity, FIG. 5 does not shows all the components for configuring a core node A and an edge node 300, but some associated with an add/drop process of a channel, together with a plurality of frames modulated on the channels. The character attached to each frame represents a core node 100 determined as a destination of the frame. For the sake of convenience and not limitation, in the description below, frame A is defined as a frame, the destination of which is the core node A.

First, a description will be made regarding a drop process of a channel of the core node A, and then regarding an add process of a channel of the core node A.

Controller 170 recognizes a corresponding destination of each frame by means of a channel portion branched off by tap coupler 155, and detects the frame targeting the corresponding destination. Further, controller 170 outputs a control signal for dropping the detected frame to the corresponding optical switch 135. Frames C, A and B are sequentially inputted to optical switch 135. Then, controller 170 recognizes that the destination of the frame A is the core node A 100, and outputs the control signal to the corresponding optical switch 135. Optical switches 135 perform switching operations, and the third channel $\lambda 3$ is inputted to egress node 410 for the edge node A' 300.

Figure 6:
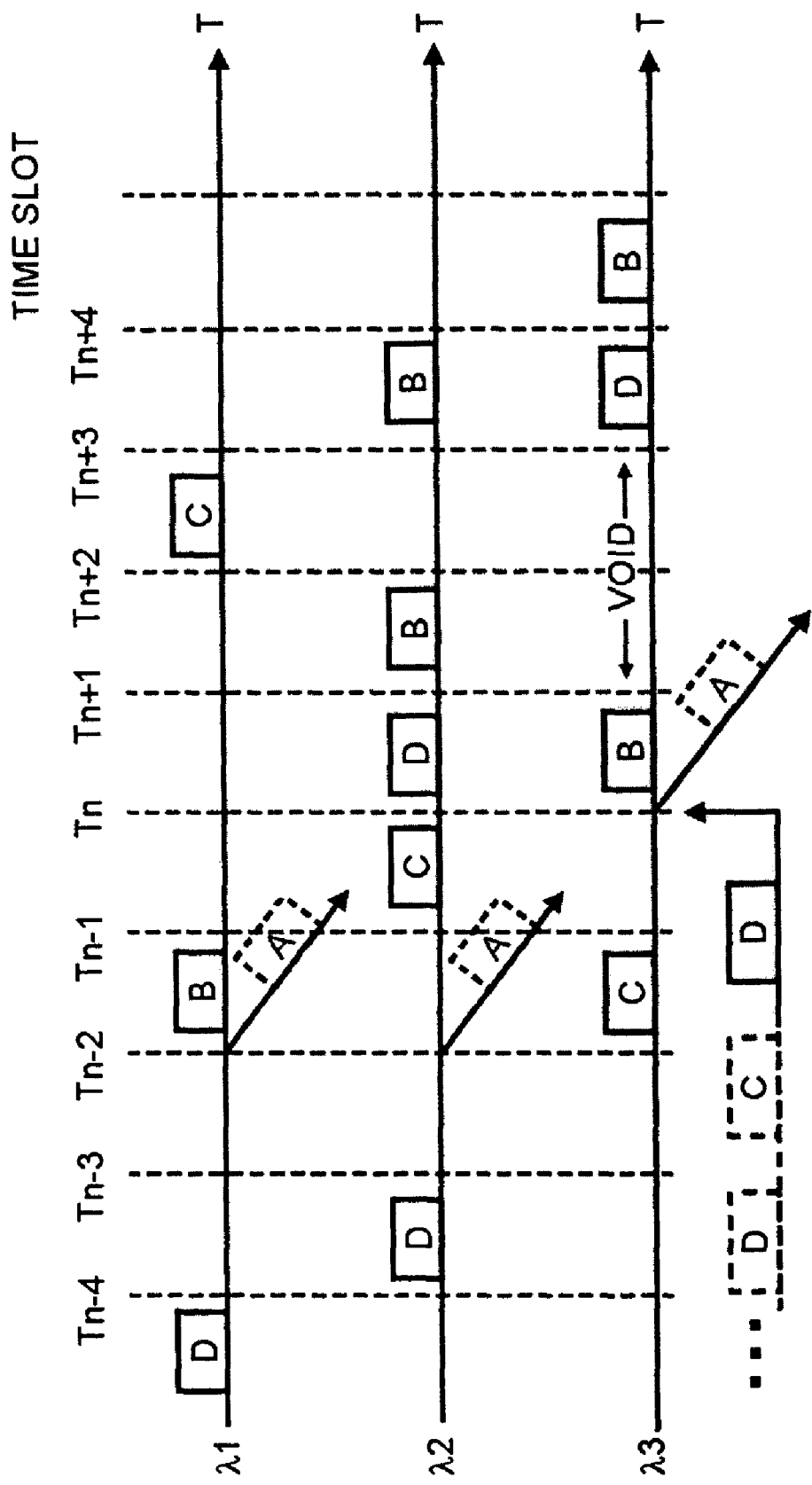
FIG. 6 shows a time slot associated with one core node A shown in FIG. 1.

The drop process will be described below with reference to FIG. 6, in time sequence.

At Tn−1, frame C is inputted. Since frame C sets the core node C as its destination, it passes through optical switches 135.

At Tn, frame A is inputted. Controller 170 outputs the control signal to optical switch 135. As optical switch 135 performs the switching operation, frame A is outputted to egress node 410 for the edge node A' 300.

At Tn+1, frame B is inputted. Controller 170 outputs the control signal to optical switch 135. As optical switch 135 performs the switching operation, frame B is outputted to multiplexer 140. Specifically, because the destination of frame B is core node B, frame B passes through optical switches 135.

Now, the add process of the channel of the core node A 100 will be described.

Controller 170 determines a fiber link, a channel and a time point for allowing frame D created at ingress node 310 to be transmitted. Burst data for frame D are stored in buffers 355 of burst assembler 350. Second electric switch 360 of ingress node 310 keeps the burst data being stored until a control signal is inputted from controller 170. Controller 170 recognizes the situations of all channels in the network by means of branching section 150. It determines burst data which should be sequentially transmitted under consideration of a QOS, a communication protocol and the like, with respect to all burst data stored in burst assembler 350 and checks all channels for a empty time slot. Then, in controller 170, when an optimal channel and a empty time slot are selected, a control signal is outputted to the second electric switch 360 in ingress node 310. Both burst data and header data, which are in a waiting state, are bound to frames, channels modulated by the frames are outputted to optical switches 135. Then, the channels pass through optical switches 135 and are inputted to multiplexer 140.

The adding process of the channel will be described below with reference to the drawings, in particular FIG. 6. Here, it is assumed that controller 170 selects a time slot of the third channel $\lambda 3$ at Tn.

In controller 170, burst data for transmission continues in a waiting state up to Tn. At Tn, a control signal is outputted into the second electric switch 360. The second electric switch 360 causes buffers 355, on which the burst data are stored, to be connected with the corresponding header attachments 375. Header attachments 375 create frames by binding the burst data with the corresponding header data. Next, the corresponding optical transmitter 385 outputs channels modulated by the frames to optical switches 135. Then, the channels are outputted through optical switches 135 to multiplexer 140.

Importantly, the optical ring network according to the present invention is capable of performing communication based on frames consisting of burst data and header data, so that it is suitable for transmission of high volume burst data. Further, the optical ring network a simple configuration using tap couplers, optical switches and so forth when performing the channel add or drop process. Consequently, it has an excellent implementation capability from a technical and economical point of view. Moreover, the optical ring network, by using electrical buffers in the edge nodes, has an improved bandwidth performance in the network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical ring network for burst data communication, the optical ring network comprising:
   a plurality of core nodes connected with each other through fiber links, wherein
   each core node comprising
      a demultiplexer, to demultiplex a received optical signal into a plurality of channels;
      an add/drop section, to drop selected channels from the plurality of channels;
      a multiplexer, to multiplex and output the plurality of channels received from the add/drop section;
      a branching section to branch off channel portions from respective channels of the a plurality of channels from the demultiplexer;
      a controller, to recognize destinations of frames modulated on each channel using the branched channel portions, and output the control signal for dropping the selected channels to the add/drop section; and
   a plurality of ingress nodes provided for each core node, the ingress node comprising:
      an interface section, connected to a plurality of service devices, to recognize destinations of packet data received from the service devices;
      a burst assembler, having a plurality of buffers subdivided according to destinations, to bind packet data stored on each buffer at a predetermined length to create a burst datum;
      a first electric switch to output packet data received from the interface section to the corresponding buffers of the burst assembler, according to a destination;
      a header attaching section to bind the received burst datum and the header datum indicating the destination to create a frame;
      a second electric switch to output burst data stored on the corresponding buffers of the burst assembler based on the control signal of the controller; and
      an optical transmitting section to permit channels modulated by frames received from the header attaching section to be outputted to the add/drop section of each core node.

2. The optical ring network according to claim 1, wherein each of the frames comprises:
   a burst datum having of a plurality of packet data; and
   a header datum representing a destination for the burst datum.

3. The optical ring network according to claim 1, wherein the plurality of nodes include a look-up table configured for storing a sequence of a buffers of a burst assembler according to a destination and a quality of service.

4. The optical ring network according to claim 1, wherein the core node further includes a plurality of egress nodes including a lookup table.

5. The optical ring network according to claim 4, wherein the look-up table are configured for storing a sequence of a corresponding interface cards according to a plurality of IP addresses.

6. The optical ring network according to claim 4, wherein the egress node further comprising:
   an interface section, connected to a plurality of service devices, to recognize destinations of packet data received from the service devices;
   a first electric switch to output packet data received from the interface section to the corresponding buffers of the burst assembler, according to a destination;
   a header attaching section to bind the received burst datum and the header datum indicating the destination to create a frame;
   a second electric switch to output burst data stored on the corresponding buffers of the burst assembler based on the control signal of the controller
   an optical transmitting section to permit channels modulated by frames received from the header attaching section to be outputted to the add/drop section of each core node; and
   wherein the burst assembler, has a plurality of buffers subdivided according to destinations, to bind packet data stored on each buffer at a predetermined length to create a burst datum.

7. An optical ring network for burst data communication, the optical ring network comprising:
   a plurality of core nodes connected with each other through fiber links, wherein each core node comprising
      a demultiplexer, to demultiplex a received optical signal into a plurality of channels;
      an add/drop section, to drop selected channels from the plurality of channels;
      a multiplexer, to multiplex and output the plurality of channels received from the add/drop section;
      a branching section to branch off channel portions from respective channels of the a plurality of channels from the demultiplexer;
      a controller, to recognize destinations of frames modulated on each channel using the branched channel portions, and output the control signal for dropping the selected channels to the add/drop section;
      an ingress node provided for each core node; and
      an egress node provided for each core node, wherein the plurality of egress nodes comprises:
   an optical receiving section to modulate and output frames from channels received from the add/drop section of each core node;
   a burst disassembler to remove header data from each frame and for disassembling the burst data into packet data;
   an IP packet forwarding section to recognize IP addresses of the packet data received from the burst disassembler;
   a plurality of interface cards connected with a plurality of service devices; and
   electric switches to permit packet data received from the IP packet forwarding section to be outputted to the corresponding interface cards based on the IP addresses.

* * * * *